United States Patent
Chang et al.

(10) Patent No.: US 9,817,588 B2
(45) Date of Patent: Nov. 14, 2017

(54) MEMORY DEVICE AND OPERATING METHOD OF SAME

(71) Applicant: Macronix International Co., Ltd., Hsinchu (TW)

(72) Inventors: Yu-Ming Chang, Jiadong Township (TW); Wei-Chieh Huang, Hsin-chu (TW); Li-Chun Huang, Hsin-chu (TW); Hung-Sheng Chang, Hsin-chu (TW); Hsiang-Pang Li, Zhubei (TW); Ting-Yu Liu, Hsin-chu (TW); Chien-Hsin Liu, Hsin-chu (TW); Nai-Ping Kuo, Hsin-chu (TW)

(73) Assignee: Macronix International Co., Ltd., Hsinchu (TW)

( * ) Notice: Subject to any disclaimer, the term of this patent is extended or adjusted under 35 U.S.C. 154(b) by 160 days.

(21) Appl. No.: 14/683,630

(22) Filed: Apr. 10, 2015

(65) Prior Publication Data

US 2016/0299710 A1    Oct. 13, 2016

(51) Int. Cl.
*G06F 3/06* (2006.01)
*G06F 12/0806* (2016.01)

(52) U.S. Cl.
CPC ............ *G06F 3/0619* (2013.01); *G06F 3/061* (2013.01); *G06F 3/0655* (2013.01); *G06F 3/0679* (2013.01); *G06F 12/0806* (2013.01); *G06F 2212/621* (2013.01)

(58) Field of Classification Search
CPC .... G06F 12/0246; G06F 3/0619; G06F 3/064; G06F 2212/2022; G06F 3/0688; G06F 3/0679; G06F 11/1441; G06F 12/0806; G06F 2212/621; G06F 3/061; G06F 3/0655; G06F 3/0685
See application file for complete search history.

(56) References Cited

U.S. PATENT DOCUMENTS

| | | | |
|---|---|---|---|
| 9,047,214 B1* | 6/2015 | Northcott | G06F 11/108 |
| 2010/0017650 A1* | 1/2010 | Chin | G06F 13/28 |
| | | | 714/6.12 |
| 2013/0091320 A1* | 4/2013 | Kawamura | G06F 12/0246 |
| | | | 711/103 |
| 2014/0059279 A1* | 2/2014 | He | G06F 12/0246 |
| | | | 711/103 |
| 2014/0337562 A1* | 11/2014 | Long | G06F 3/0659 |
| | | | 711/103 |
| 2015/0378642 A1* | 12/2015 | Moon | G06F 3/0619 |
| | | | 711/103 |

* cited by examiner

*Primary Examiner* — Hashem Farrokh
(74) *Attorney, Agent, or Firm* — Finnegan, Henderson, Farabow, Garrett & Dunner LLP

(57) ABSTRACT

A memory device includes a memory controller and a non-volatile memory communicatively coupled to the memory controller and storing a mapping table and a journal table. The memory controller is configured to write data and a logical address of the data into the non-volatile memory, load mapping information related to the logical address of the data from the mapping table of the non-volatile memory into a mapping cache of the memory controller, update the mapping cache with an updated mapping relationship between the logical address of the data and a physical address of the data, and perform a journaling operation to write the updated mapping relationship into the journal table.

19 Claims, 9 Drawing Sheets

| SRAM 124 | Flash Memory 140 |
|---|---|

Step 311: System power up

Mapping Table 144

|  | | | | |
|---|---|---|---|---|
| [#0] | 0_0 | 0_1 | 0_2 | 0_3 |
| [#1] | 1_0 | 1_1 | 1_2 | 1_3 |
| [#2] | 2_0 | 2_1 | 2_2 | 2_3 |
| [#3] | 3_0 | 3_1 | 3_2 | 3_3 |
| [#4] | 4_0 | 4_1 | 4_2 | 4_3 |

Step 312: Write Data1 with LA "0_0"

Mapping Cache 128

|  | | | | |
|---|---|---|---|---|
| [#0] | 101_0 | 0_1 | 0_2 | 0_3 |
| [#] | | | | |

Write Back Cache 130

| [#] | |
|---|---|
| [#] | |

Data Block 320

| PA | Data | LA |
|---|---|---|
| 101_0 | Data1 | 0_0 |
| 101_1 | | |
| 101_2 | | |
| 101_3 | | |

Step 313: Write Data2 with LA "1_0"

Mapping Cache 128

|  | | | | |
|---|---|---|---|---|
| [#0] | 101_0 | 0_1 | 0_2 | 0_3 |
| [#1] | 101_1 | 1_1 | 1_2 | 1_3 |

Write Back Cache 130

| [#] | |
|---|---|
| [#] | |

Data Block 320

| PA | Data | LA |
|---|---|---|
| 101_0 | Data1 | 0_0 |
| 101_1 | Data2 | 1_0 |
| 101_2 | | |
| 101_3 | | |

Step 314: Write Data3 with LA "1_1"

Mapping Cache 128

|  | | | | |
|---|---|---|---|---|
| [#0] | 101_0 | 0_1 | 0_2 | 0_3 |
| [#1] | 101_1 | 101_2 | 1_2 | 1_3 |

Write Back Cache 130

| [#] | |
|---|---|
| [#] | |

Data Block 320

| PA | Data | LA |
|---|---|---|
| 101_0 | Data1 | 0_0 |
| 101_1 | Data2 | 1_0 |
| 101_2 | Data3 | 1_1 |
| 101_3 | | |

Step 315: Write Data4 with LA "1_2"

Mapping Cache 128

|  | | | | |
|---|---|---|---|---|
| [#0] | 101_0 | 0_1 | 0_2 | 0_3 |
| [#1] | 101_1 | 101_2 | 101_3 | 1_3 |

Write Back Cache 130

| [#] | |
|---|---|
| [#] | |

Data Block 320

| PA | Data | LA |
|---|---|---|
| 101_0 | Data1 | 0_0 |
| 101_1 | Data2 | 1_0 |
| 101_2 | Data3 | 1_1 |
| 101_3 | Data4 | 1_2 |

Step 316: Perform journaling operation

Journal Table 146

| (0_0 101_0), (1_0 101_1), (1_1 101_2), (1_2 101_3) | [#0],[#1] | FF,FF |
|---|---|---|

SRAM 124

Step 411: Write Data5 with LA "0_0"

Mapping Cache 128

| | | | | |
|---|---|---|---|---|
| [#0] | 102_0 | 0_1 | 0_2 | 0_3 |
| [#1] | 101_1 | 101_2 | 101_3 | 1_3 |

Write Back Cache 130

| | |
|---|---|
| [#0] | |
| [#1] | |

Step 412: Write Data6 with LA "2_0"

Mapping Cache 128

| | | | | |
|---|---|---|---|---|
| [#0] | 102_0 | 0_1 | 0_2 | 0_3 |
| [#2] | 102_1 | 2_1 | 2_2 | 2_3 |

↘ [#1] | 101_1 | 101_2 | 101_3 | 1_3 |

Write Back Cache 130

| | |
|---|---|
| [#0] | |
| [#1] | v |

Step 413: Write Data7 with LA "3_1"

Mapping Cache 128

| | | | | |
|---|---|---|---|---|
| [#3] | 3_0 | 102_2 | 3_2 | 3_3 |
| [#2] | 102_1 | 2_1 | 2_2 | 2_3 |

↘ [#0] | 102_0 | 0_1 | 0_2 | 0_3 |

Write Back Cache 130

| | |
|---|---|
| [#0] | v |
| [#1] | v |

Step 414: Write Data8 with LA "0_3"

Mapping Cache 128

| | | | | |
|---|---|---|---|---|
| [#3] | 3_0 | 102_2 | 3_2 | 3_3 |
| [#0] | 102_0 | 0_1 | 0_2 | 102_3 |

↘ [#2] | 102_1 | 2_1 | 2_2 | 2_3 |

Write Back Cache 130

| | |
|---|---|
| [#0] | v |
| [#1] | v |

Step 415: Perform journaling operation

Flash Memory 140

Data Block 420

| PA | Data | LA |
|---|---|---|
| 102_0 | Data5 | 0_0 |
| 102_1 | | |
| 102_2 | | |
| 102_3 | | |

Data Block 420

| PA | Data | LA |
|---|---|---|
| 102_0 | Data5 | 0_0 |
| 102_1 | Data6 | 2_0 |
| 102_2 | | |
| 102_3 | | |

Mapping Table 144

| | | | | |
|---|---|---|---|---|
| [#0] | 0_0 | 0_1 | 0_2 | 0_3 |
| [#1] | 101_1 | 101_2 | 101_3 | 1_3 |
| [#2] | 2_0 | 2_1 | 2_2 | 2_3 |
| [#3] | 3_0 | 3_1 | 3_2 | 3_3 |
| [#4] | 4_0 | 4_1 | 4_2 | 4_3 |

Data Block 420

| PA | Data | LA |
|---|---|---|
| 102_0 | Data5 | 0_0 |
| 102_1 | Data6 | 2_0 |
| 102_2 | Data7 | 3_1 |
| 102_3 | | |

Mapping Table 144

| | | | | |
|---|---|---|---|---|
| [#0] | 102_0 | 0_1 | 0_2 | 0_3 |
| [#1] | 101_1 | 101_2 | 101_3 | 1_3 |
| [#2] | 2_0 | 2_1 | 2_2 | 2_3 |
| [#3] | 3_0 | 3_1 | 3_2 | 3_3 |
| [#4] | 4_0 | 4_1 | 4_2 | 4_3 |

Data Block 420

| PA | Data | LA |
|---|---|---|
| 102_0 | Data5 | 0_0 |
| 102_1 | Data6 | 2_0 |
| 102_2 | Data7 | 3_1 |
| 102_3 | Data8 | 0_3 |

Mapping Table 144

| | | | | |
|---|---|---|---|---|
| [#0] | 102_0 | 0_1 | 0_2 | 0_3 |
| [#1] | 101_1 | 101_2 | 101_3 | 1_3 |
| [#2] | 102_1 | 2_1 | 2_2 | 2_3 |
| [#3] | 3_0 | 3_1 | 3_2 | 3_3 |
| [#4] | 4_0 | 4_1 | 4_2 | 4_3 |

Journal Table 146

| | | |
|---|---|---|
| (0_0  101_0), (1_0  101_1), (1_1  101_2), (1_2  101_3) | [#0],[#1] | FF,FF |
| (0_3  102_3), (3_1  102_2) | [#0],[#3] | [#0],[#1] |

| SRAM 124 | Flash Memory 140 |

Step 611: Write Data13 with LA "0_1"

Mapping Cache 128
| | | | | |
|---|---|---|---|---|
| [#4] | 103_1 | 103_2 | 4_2 | 4_3 |
| [#0] | 102_0 | 200_0 | 103_0 | 103_3 |

Write Back Cache 130
| | |
|---|---|
| [#0] | |
| [#4] | |

Data Block 620
| PA | Data | LA |
|---|---|---|
| 200_0 | Data13 | 0_1 |
| 200_1 | | |
| 200_2 | | |
| 200_3 | | |

Step 612: Write Data14 with LA "4_2"

Mapping Cache 128
| | | | | |
|---|---|---|---|---|
| [#4] | 103_1 | 103_2 | 200_1 | 4_3 |
| [#0] | 102_0 | 200_0 | 103_0 | 103_3 |

Write Back Cache 130
| | |
|---|---|
| [#0] | |
| [#4] | |

Data Block 620
| PA | Data | LA |
|---|---|---|
| 200_0 | Data13 | 0_1 |
| 200_1 | Data14 | 4_2 |
| 200_2 | | |
| 200_3 | | |

Step 613: Write Data15 with LA "4_3"

Mapping Cache 128
| | | | | |
|---|---|---|---|---|
| [#4] | 103_1 | 103_2 | 200_1 | 200_2 |
| [#0] | 102_0 | 200_0 | 103_0 | 103_3 |

Write Back Cache 130
| | |
|---|---|
| [#0] | |
| [#4] | |

Data Block 620
| PA | Data | LA |
|---|---|---|
| 200_0 | Data13 | 0_1 |
| 200_1 | Data14 | 4_2 |
| 200_2 | Data15 | 4_3 |
| 200_3 | | |

SRAM 124 | Flash Memory 140

Step 711a

| Mapping Cache 128 | | | |
|---|---|---|---|
| [#] | | | |
| [#] | | | |

Data Block 620

| PA | Data | LA |
|---|---|---|
| 200_0 | Data13 | 0_1 |
| 200_1 | Data14 | 4_2 |
| 200_2 | Data15 | 4_3 |
| 200_3 | | |

Step 711b

| Mapping Cache 128 | | | |
|---|---|---|---|
| [#0] 102_0 | 0_1 | 0_2 | 0_3 |
| [#] | | | |

Mapping Table 144

| | | | | |
|---|---|---|---|---|
| [#0] | 102_0 | 0_1 | 0_2 | 0_3 |
| [#1] | 101_1 | 101_2 | 101_3 | 1_3 |
| [#2] | 102_1 | 2_1 | 2_2 | 2_3 |
| [#3] | 3_0 | 102_2 | 3_2 | 3_3 |
| [#4] | 4_0 | 4_1 | 4_2 | 4_3 |

Step 711c

| Mapping Cache 128 | | | |
|---|---|---|---|
| [#0] 101_0 | 0_1 | 0_2 | 0_3 |
| [#] | | | |

Journal Table 146

| | | | |
|---|---|---|---|
| (0_0 101_0), (1_0 101_1), (1_1 101_2), (1_2 101_3) | [#0],[#1] | FF,FF |
| (0_3 102_3), (3_1 102_2) | [#0],[#3] | [#0],[#1] |
| (0_2 103_0), (0_3 103_3), (4_0 103_1), (4_1 103_2) | [#0],[#4] | [#3] |

Step 712a

| Mapping Cache 128 | | | |
|---|---|---|---|
| [#0] ~~101_0~~ | ~~0_1~~ | ~~0_2~~ | ~~0_3~~ |
| [#] | | | |

Step 712b

| Mapping Cache 128 | | | |
|---|---|---|---|
| [#0] 102_0 | 0_1 | 0_2 | 0_3 |
| [#] | | | |

Step 712c

| Mapping Cache 128 | | | |
|---|---|---|---|
| [#0] 102_0 | 0_1 | 0_2 | 102_3 |
| [#] | | | |

Step 713a

| Mapping Cache 128 | | | |
|---|---|---|---|
| [#0] 102_0 | 0_1 | 0_2 | 102_3 |
| [#] | | | |

Step 713b

| Mapping Cache 128 | | | |
|---|---|---|---|
| [#0] 102_0 | 0_1 | 0_2 | 102_3 |
| [#4] 4_0 | 4_1 | 4_2 | 4_3 |

Step 713c

| Mapping Cache 128 | | | |
|---|---|---|---|
| [#0] 102_0 | 0_1 | 103_0 | 103_3 |
| [#4] 103_1 | 103_2 | 4_2 | 4_3 |

Step 714

| Mapping Cache 128 | | | |
|---|---|---|---|
| [#0] 102_0 | 200_0 | 103_0 | 103_3 |
| [#4] 103_1 | 103_2 | 200_1 | 200_2 |

MEMORY DEVICE AND OPERATING METHOD OF SAME

FIELD OF THE DISCLOSURE

The present disclosure relates to a memory device and operation method of the same and, more particularly, to a memory device that includes a non-volatile memory.

BACKGROUND

A non-volatile memory device is a semiconductor device capable of continuously storing data even when the supply of electricity is removed. A flash memory is a type of non-volatile memory device that has been developed. The operation of the flash memory typically includes writing updated data to an unused physical location. In order to effectively track the physical location of the data in the flash memory, a mapping table is provided for the flash memory to store mapping information between a logical address of the data usable by an external system and a physical address of the data usable by the flash memory.

SUMMARY

According to an embodiment of the disclosure, a memory device includes a memory controller and a non-volatile memory communicatively coupled to the memory controller and storing a mapping table and a journal table. The memory controller is configured to write data and a logical address of the data into the non-volatile memory, load mapping information related to the logical address of the data from the mapping table of the non-volatile memory into a mapping cache of the memory controller, update the mapping cache with an updated mapping relationship between the logical address of the data and a physical address of the data, and perform a journaling operation to write the updated mapping relationship into the journal table.

According to another embodiment of the disclosure, a method for controlling a memory device by a memory controller is provided. The memory device includes a non-volatile memory which stores a mapping table and a journal table. The method includes writing data and a logical address of the data into the non-volatile memory, loading mapping information related to the logical address of the data from the mapping table of the non-volatile memory into a mapping cache of the memory controller, updating the mapping cache with an updated mapping relationship between the logical address of the data and a physical address of the data, and performing a journaling operation to write the updated mapping relationship into the journal table.

According to a further embodiment of the disclosure, a memory controller for controlling a non-volatile memory is provided. The non-volatile memory stores a mapping table and a journal table. The memory controller includes processing circuitry configured to write data and a logical address of the data into the non-volatile memory, load mapping information related to the logical address of the data from the mapping table of the non-volatile memory into a mapping cache of the memory controller, update the mapping cache with an updated mapping relationship between the logical address of the data and a physical address of the data, and perform a journaling operation to write the updated mapping relationship into the journal table.

The accompanying drawings, which are incorporated in and constitute a part of this specification, illustrate disclosed embodiments and, together with the description, serve to explain the disclosed embodiments.

BRIEF DESCRIPTION OF THE DRAWINGS

FIGS. 3-6 illustrate an example of a writing process, according to an illustrated embodiment.

FIG. 7 illustrates an example of a recovery process, according to an illustrated embodiment.

DETAILED DESCRIPTION

Reference will now be made in detail to the present embodiments, examples of which are illustrated in the accompanying drawings. Wherever possible, the same reference numbers will be used throughout the drawings to refer to the same or like parts.

Figure 1:
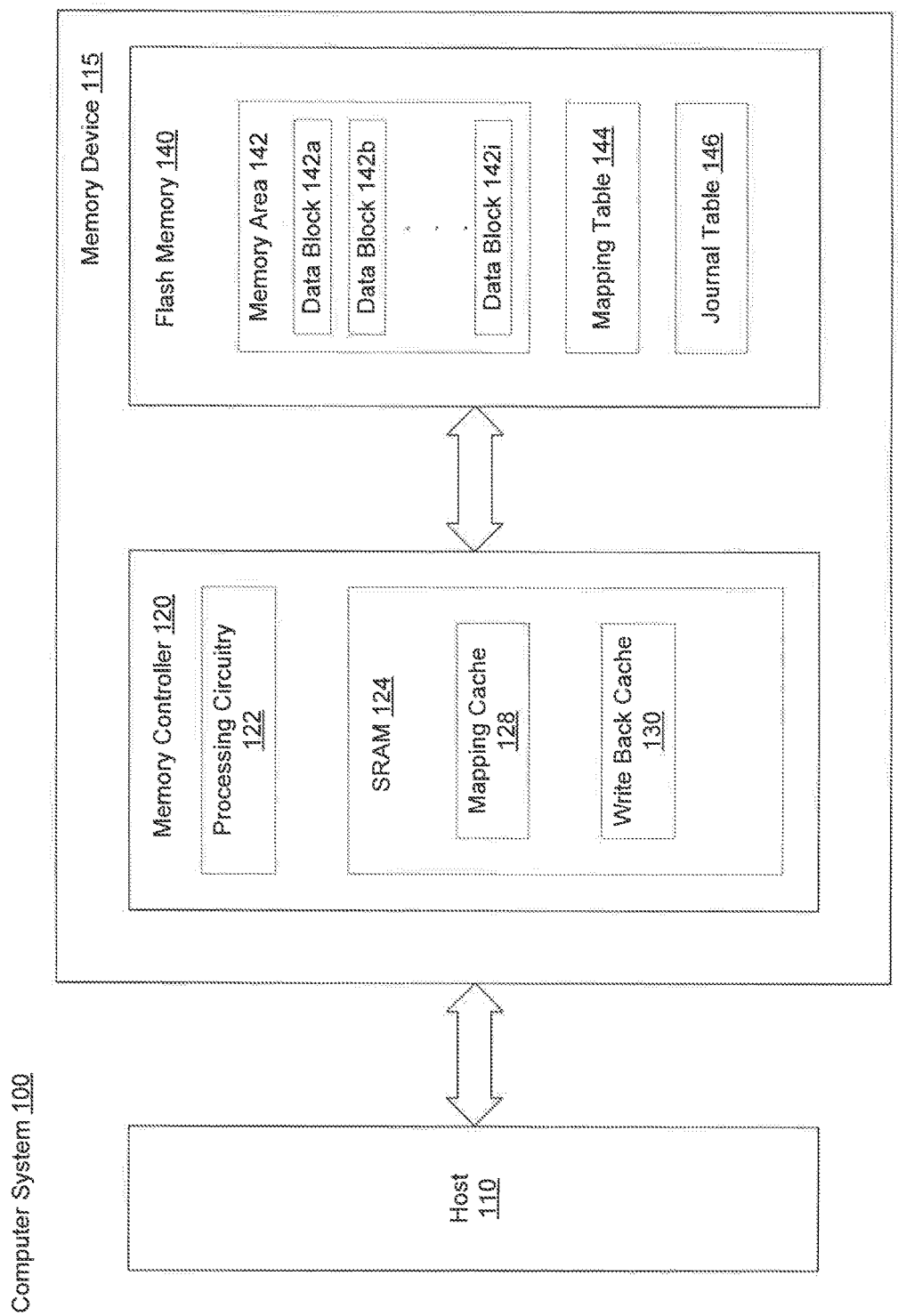
FIG. 1 is a block diagram of a computer system, according to an illustrated embodiment.

FIG. 1 is a block diagram of a computer system 100 (hereinafter referred to as "system 100"), according to an illustrated embodiment. Referring to FIG. 1, system 100 includes a host 110 and a memory device 115, which includes a memory controller 120 and a non-volatile memory 140 communicatively coupled to memory controller 120. Non-volatile memory 140 can be implemented by a flash memory. In the following description, non-volatile memory 140 is referred to as "flash memory 140". However, those skilled in the art will appreciate that non-volatile memory 140 can be implemented by any other type of non-volatile memory, such as a read-only memory (ROM), a ferroelectric random access memory (F-RAM), a magnetic computer storage device, or an optical disc.

Host 110 can send a read or write request to memory controller 120 of memory device 115. Memory controller 120 can control an operation of flash memory 140 in response to the read or write request received from host 110.

Memory controller 120 includes a processing circuitry 122 and a volatile memory 124. Processing circuitry 122 controls the overall operation of memory controller 120. Volatile memory 124 can be implemented by a fast random-access memory such as a dynamic random-access memory (DRAM), a static random-access memory (SRAM), or a parameter random-access memory (PRAM). In the following description, volatile memory 124 is referred to as "SRAM 124". However, those skilled in the art will appreciate that volatile memory 124 can be implemented by any other type of volatile memory, such as a DRAM or a PRAM. SRAM 124 functions as a working memory of memory controller 120. SRAM 124 stores a mapping cache 128 and a write back cache 130. Mapping cache 128 temporarily stores mapping information used by memory controller 120. Write back cache 130 is used for record operations performed on mapping cache 128 between two consecutive journaling operations, as described more fully below.

Flash memory 140 includes a plurality of blocks used to store memory data in a memory area 142, mapping information in a mapping table 144, and journal information in a journal table 146. Memory area 142 stores user data received from host 110 via memory controller 120. Memory area 142 is formed of a plurality of data blocks 142a, 142b, . . . , 142i each having a plurality of pages. Each data block 142a, 142b, . . . , 142i has a data area for storing user data, and a spare area for storing additional information related to the user data stored in that data block, such as a physical address and/or a logical address of the user data. Mapping table 144 stores mapping information between logical addresses and physical addresses of data stored in memory area 142. Journal table 146 stores journal information, which is the mapping information that has been changed due to an operation (e.g., a write operation) performed by memory controller 120. More particularly, journal table 146 includes a mapping information area which stores updated mapping information of mapping cache 128, a final cache area which stores mapping cache information of mapping cache 128, and a write back area which stores write back information of write back cache 130.

Figure 2:
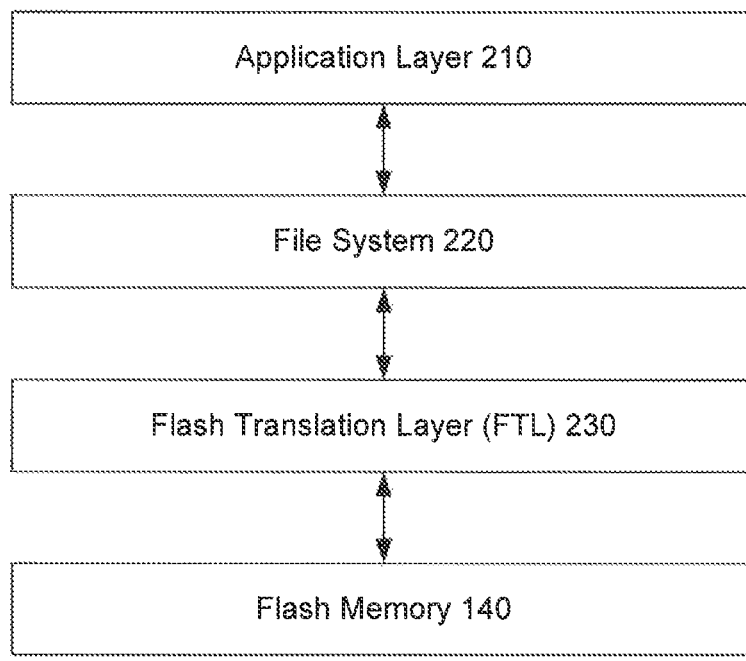
FIG. 2 is a block diagram of software layers of the computer system of FIG. 1, according to an illustrated embodiment.

FIG. 2 is a block diagram of software layers of system 100 of FIG. 1, according to an illustrated embodiment. Referring to FIG. 2, the software layers of system 100 include an application layer 210, a file system 220, a flash translation layer (FTL) 230, and flash memory 140. Application layer 210 includes a variety of applications running in system 100. File system 220 organizes data or files to be stored in flash memory 140. File system 220 is driven by host 110. FTL 230 provides an interface between host 110 and flash memory 140. In some embodiments, FTL 230 receives a logical address (LA) generated by file system 220, and translates the logical address to a physical address (PA) usable by flash memory 140.

As described previously, the working memory of memory controller 120 is formed of SRAM 124, which is a volatile memory. That is, when power being supplied to SRAM 124 is interrupted, data stored in SRAM 124 is lost, resulting in an inconsistency between the data stored in SRAM 124 and the data stored in flash memory 140. A solution to this problem has been proposed to periodically copy all of the data from SRAM 124 to flash memory 140, so that the data on flash memory 140 can be recovered or be consistent with the data on SRAM 124 even when the power is interrupted. However, periodically coping all of the data from SRAM 124 to flash memory 140 introduces a large overhead on data handling, thus degrading system performance. In contrast, an efficient journaling method according to an embodiment of the present disclosure achieves reliable managing of the data stored in SRAM 124 with negligible overhead.

FIGS. 3-6 illustrate an example of a writing process for managing the data stored in SRAM 124, according to an illustrated embodiment. In the example illustrated in FIGS. 3-6, a logical address "N_M" (where N and M each represents any integer greater than or equal to 0) represents a logical block number "N" and a logical page number "M". Similarly, a physical address "A_B" (where A and B each represents any integer greater than or equal to 0) represents a physical block number "A" and a physical page number "B".

In the example illustrated in FIGS. 3-6, a mapping table includes a plurality of cells arranged in columns and rows. Each cell represents a mapping relationship between a logical address and a physical address. The location (i.e., a row number "N" and column number "M") of a cell in the mapping table represents a logical address "N_M". The information "A_B" contained in a cell in the mapping table represents a physical address "A_B".

In the example illustrated in FIGS. 3-6, it is assumed that each data block of flash memory 140 has four (4) pages. However, those skilled in the art will now understand that each data block in flash memory 140 can have more than four (4) pages.

In the example illustrated in FIGS. 3-6, it is assumed that mapping cache 128 includes a plurality of cells arranged in four columns and two rows, and can store mapping information of two logical blocks. Each row in the mapping cache has a cache number [#N], which represents a logical block number "N". A column number "M" represents a logical page number "M". That is, a cell at column M of cache [#N] represents a logical address "N_M". In addition, the information "A_B" contained in a cell of a mapping cache represents a physical address "A_B". Thus, mapping cache 128 can store mapping information of more than two logical blocks.

In the example illustrated in FIGS. 3-6, the tables illustrated on the left-side of the figures are stored in SRAM 124, and the tables illustrated on the right-side of the figures are stored in flash memory 140.

Referring to FIG. 3, first, system 100 is powered up in step 311. At this stage, mapping cache 128 and write back cache 130 of SRAM are empty, while mapping table 144 of flash memory 140 stores the entire mapping table for flash memory 140. As indicated by mapping table 144 illustrated in FIG. 3, initially (when system 100 is powered up), LA "0_0" maps to PA "0_0", LA "0_1" maps to PA "0_1", and so on.

In step 312, when memory controller 120 receives a write request for writing Data1 with LA "0_0" into flash memory 140, memory controller 120 assigns a free data block 320 having a physical block number "101" for writing data. Memory controller 120 then writes Data1 into the data area of a first page (i.e., page "0") of data block 320, the first page of data block 320 having PA "101_0". Memory controller 120 also writes LA "0_0" of Data1 into a spare area of the first page of data block 320.

Now LA "0_0" maps to PA "101_0" instead of PA "0_0", so memory controller 120 stores an updated mapping relationship between LA "0_0" and PA "101_0", i.e., "0_0→101_0", in mapping cache 128 of SRAM 124. In order to store the updated mapping relationship, memory controller 120 loads the mapping information related to logical block number "0" (which corresponds to LA "0_0" in the updated mapping relationship) from mapping table 144 into mapping cache 128 as cache [#0]. Memory controller 120 then updates cache [#0] in mapping cache 128 with the updated mapping relationship "0_0→101_0", by changing the information contained in the cell at column 0 of cache [#0] from "0_0" to "101_0" (highlighted in grey in FIG. 3). At this stage, because memory controller 120 does not write any mapping information in mapping cache 128 back to flash memory 140, write back cache 130 is empty.

In step 313, when memory controller 120 receives a write request to write Data2 with LA "1_0" into flash memory 140, memory controller 120 writes Data2 into the data area of a second page (i.e., page "1") of data block 320, the second page of data block 320 having PA "101_1". Memory controller 120 also writes LA "1_0" of Data2 into the spare area of the second page of data block 320. Then, in order to store an updated mapping relationship "1_0→101_1" in mapping cache 128, memory controller 120 loads the mapping information related to logical block number "1" (which corresponds to LA "1_0" in the updated mapping relationship) from mapping table 144 into mapping cache 128 as cache [#1]. Memory controller 120 then updates cache [#1] in mapping cache 128 with the updated mapping relationship "1_0→101_1" (highlighted in grey in FIG. 3).

In step 314, when memory controller 120 receives a write request to write Data3 with LA "1_1" into flash memory 140, memory controller 120 writes Data3 into the data area of a third page (i.e., page "2") of data block 320, the third page of data block 320 having PA "101_2". Memory controller 120 also writes LA "1_1" of Data3 into the spare area of the third page of data block 320. For the next step of storing the updated mapping relationship "1_1→101_2" in mapping cache 128, because mapping cache 128 already contains the mapping information related to logical block number "1" (which corresponds to LA "1_1" in the updated mapping relationship), memory controller 120 does not need to load the mapping information related to logical block number "1" into mapping cache 128. Instead, memory controller 120 directly updates cache [#1] in mapping cache 128 with the updated mapping relationship "1_1→101_2" (highlighted in grey in FIG. 3).

In step 315, when memory controller 120 receives a write request to write Data4 with LA "1_2" into flash memory 140, memory controller 120 writes Data4 into the data area of a fourth page (i.e., page "3") of data block 320, the fourth page of data block 320 having PA "101_3". Memory controller 120 also writes LA "1_3" of Data4 into the spare area of the fourth page of data block 320. Memory controller 120 then updates cache [#1] in mapping cache 128 with an updated mapping relationship "1_2→101_3" (highlighted in grey in FIG. 3).

After the fourth page of data block 320 is written with data, memory controller 120 determines that data block 320 is full and, as a result, performs a journaling operation in step 316 to record the updated mapping information. In the journaling operation, memory controller 120 writes all of the updated mapping information, mapping cache information related to mapping cache 128, and write back information related to write back cache 130, into a first page (i.e., page "1") of journal table 146 of flash memory 140. First, memory controller 120 writes the updated mapping information currently stored in mapping cache 128 into a mapping information area of page "1" of journal table 146. That is, memory controller 120 writes all of mapping relationships "0_0→101_0", "1_0→101_1", "1_1→101_2", and "1_2→101_3" into the mapping information area of page "1" of journal table 146. Memory controller 120 also writes the cache numbers that are currently stored in mapping cache 128 into a final cache area of page "1" of journal table 146. That is, memory controller 120 writes cache numbers [#0] and [#1] into the final cache area of page "1" of journal table 146. Because the current write back cache 130 is empty, memory controller 120 does not write any write back information into journal table 146. Therefore, the write back area of page "1" of journal table 146 contains "FF,FF", indicating that no mapping information has been written back to flash memory 140 when memory controller 120 writes mapping information into page "1" of journal table 146.

Referring to FIG. 4, in step 411, when memory controller 120 receives a write request to write Data5 with LA "0_0" into flash memory 140, memory controller 120 assigns data block 420 having a physical block number "102" for writing data. Memory controller 120 then writes Data5 into the data area of a first page (i.e., page "0") of data block 420, the first page of data block 420 having PA "102_0". Memory controller 120 also writes LA "0_0" of Data5 into the spare area of the first page of data block 420. Memory controller 120 then updates cache [#0] in mapping cache 128 with an updated mapping relationship "0_0→102_0" (highlighted in grey in FIG. 4). At this stage, memory controller 120 loads the cache numbers recorded in the final cache area of the previous page (i.e., page "1") of journal table 146 into write back cache 130. That is, memory controller 120 loads cache numbers [#0] and [#1] into write back cache 130. However, because memory controller 120 does not write any mapping information in mapping cache 128 back to flash memory 140, there is no data entry corresponding to cache number [#0] and [#1] in write back cache 130.

In step 412, when memory controller 120 receives a write request to write Data6 with LA "2_0" into flash memory 140, memory controller 120 writes Data6 into the data area of a second page (i.e., page "1") of data block 420, the second page of data block 420 having PA "102_1". Memory controller 120 also writes LA "2_0" of Data6 into the spare area of the second page of data block 420. Then, memory controller 120 prepares to store the updated mapping relationship "2_0→102_1" in mapping cache 128 of SRAM 124. Because mapping cache 128 currently has cache [#0] and cache [#1] that respectively store mapping information of logical block "0" and logical block "1", mapping cache 128 reaches its maximum capacity of storing mapping information of two logical blocks, i.e., mapping cache 128 is full. As a result, memory controller 120 determines to remove a less-frequently used row (i.e., cache number) in mapping cache 128, by writing mapping information in the less-frequently used cache in mapping cache 128 back to mapping table 144 of flash memory 140. In the example of FIG. 4, memory controller 120 determines that cache [#1] is less-frequently used than cache [#0]. Therefore, memory controller 120 writes the mapping information in cache [#1] back to row [#1] in mapping table 144 of flash memory 140. As a result, row [#1](highlighted in grey in FIG. 4) in mapping table 144 of flash memory 140 is updated with the most recent mapping information stored in mapping cache 128. Memory controller 120 then loads the mapping information corresponding to logical block number "2" (which corresponds to LA "2_0" in the updated mapping relationship) from mapping table 144 into mapping cache 128 as cache [#2]. Memory controller 120 updates cache [#2] in mapping cache 128 with the updated mapping relationship "2_0→102_1" (highlighted in grey in FIG. 4). Memory controller 120 further records the write back information in write back cache 130, by marking cache [#1] with "v", indicating that cache [#1] has been written back to mapping table 144 of flash memory 140.

In step 413, when memory controller 120 receives a write request to write Data7 with LA "3_1" into flash memory 140, memory controller 120 writes Data7 into the data area of a third page (i.e., page "2") of data block 420, the third page of data block 420 having PA "102_2". Memory controller 120 also writes LA "3_1" of Data7 into the spare area of the third page of data block 420. Then, memory controller 120 prepares to store the updated mapping relationship "3_1→102_2" in mapping cache 128 of SRAM 124. Because mapping cache 128 is currently full, memory controller 120 writes the mapping information in cache [#0], which is the less-frequently used cache, back to row [#0] in mapping table 144 of flash memory 140, and loads the mapping information related to logical block number "3" (which corresponds to LA "3_1" in the updated mapping relationship) from mapping table 144 into mapping cache 128 as cache [#3]. Memory controller 120 then updates cache [#3] in mapping cache 128 with the updated mapping relationship "3_1→102_2" (highlighted in grey in FIG. 4). Memory controller 120 further updates write back cache 130 by marking cache [#0] with "v", indicating that cache [#0] has been written back to mapping table 144 of flash memory 140.

In step 414, when memory controller 120 receives a write request to write Data8 with LA "0_3" into flash memory 140, memory controller 120 writes Data8 into the data area of a fourth page (i.e., page "3") of data block 420, the fourth page of data block 420 having PA "102_3". Memory controller 120 also writes LA "0_3" of Data8 into the spare area of the fourth page of data block 420. Then, memory controller 120 prepares to store the updated mapping relationship "0_3→102_3" in mapping cache 128 of SRAM 124. Because mapping cache 128 is currently full, memory controller 120 writes the mapping information in cache [#2], which is the less-frequently used cache, back to row [#2] in mapping table 144 of flash memory 140, and loads the mapping information related to logical block number "0" (which corresponds to LA "0_3" in the updated mapping relationship) from mapping table 144 into mapping cache 128 as cache [#0]. Memory controller 120 then updates cache [#0] in mapping cache 128 with the updated mapping relationship "0_3→102_3" (highlighted in grey in FIG. 4). Because cache [#0] and [#1] in write back cache 130 have been marked with "v", memory controller 120 does not further update write back cache 130.

After the fourth page of data block 420 is written with data, memory controller 120 determines that data block 420 is full and, as a result, performs a journaling operation in step 415. In the journaling operation, memory controller 120 writes all of the updated mapping information, mapping cache information, and write back information into a second page (i.e., page "2") of journal table 146. First, memory controller writes the updated mapping information currently stored in mapping cache 128 into a mapping information area of page "2" of journal table 146. That is, memory controller 120 writes all of mapping relationships "0_3→102_3" and "3_1→102_2" into the mapping information area of page "2" of journal table 146. Because the mapping relationship "0_0→102_0" has already been recorded in mapping table 144 of flash memory 140, it is not necessary to write the mapping relationship "0_0→102_0" into journal table 146. Memory controller 120 also writes the cache numbers that are currently stored in mapping cache 128 into a final cache area of page "2" of journal table 146. That is, memory controller 120 writes cache numbers [#0] and [#3] into the final cache area of page "2" of journal table 146. Memory controller 120 further writes the cache number that has been written back to mapping table 144 as indicated in write back cache 130, into a write back area of page "2" of journal table 146. That is, memory controller 120 writes cache numbers [#0] and [#1] into the write back area of page "2" of journal table 146.

Figure 5:

Referring to FIG. 5, in step 511, when memory controller 120 receives a write request to write Data9 with LA "0_2" into flash memory 140, memory controller 120 assigns data block 520 having a physical block number "103" for writing data. Memory controller 120 then writes Data9 into the data area of a first page (i.e., page "0") of data block 520, the first page of data block 520 having PA "103_0". Memory controller 120 also writes LA "0_2" of Data9 into the spare area of the first page of data block 520. Memory controller 120 then updates cache [#0] in mapping cache 128 with an updated mapping relationship "0_2→103_0" (highlighted in grey in FIG. 5). At this stage, memory controller 120 loads the cache numbers recorded in the final cache area of the previous page (i.e., page "3") of journal table 146 into write back cache 130. That is, memory controller 120 loads cache numbers [#0] and [#3] into write back cache 130. However, because memory controller 120 does not write any mapping information in mapping cache 128 back to flash memory 140, there is no data entry corresponding to cache number [#0] and [#3] in write back cache 130.

In step 512, when memory controller 120 receives a write request to write Data10 with LA "4_0" into flash memory 140, memory controller 120 writes Data10 into the data area of a second page (i.e., page "1") of data block 520, the second page of data block 520 having PA "103_1". Memory controller 120 also writes LA "4_0" of Data10 into the spare area of the second page of data block 520. Then, memory controller 120 needs to store the updated mapping relationship "4_0→103_1" in mapping cache 128 of SRAM 124. Because mapping cache 128 is currently full, memory controller 120 writes the mapping information in cache [#3], which is the less-frequently used cache number, back to row [#3] in mapping table 144 of flash memory 140, and loads the mapping information related to logical block number "4" (which corresponds to LA "4_0" in the updated mapping relationship) from mapping table 144 into mapping cache 128 as cache [#4]. Memory controller 120 then updates cache [#4] in mapping cache 128 with the updated mapping relationship "4_0→103_1" (highlighted in grey in FIG. 5). Memory controller 120 further updates write back cache 130 by marking cache [#3] with "v", indicating that cache [#3] has been written back to mapping table 144 of flash memory 140.

In step 513, when memory controller 120 receives a write request to write Data11 with LA "4_1" into flash memory 140, memory controller 120 writes Data11 into the data area of a third page (i.e., page "2") of data block 520, the third page of data block 520 having PA "103_2". Memory controller 120 also writes LA "4_1" of Data11 into the spare area of the third page of data block 520. Memory controller 120 then updates cache [#4] in mapping cache 128 with an updated mapping relationship "4_1→103_2" (highlighted in grey in FIG. 5). Because memory controller 120 does not write any mapping information back to mapping table 144, write back cache 130 remains unchanged.

In step 514, when memory controller 120 receives a write request to write Data12 with LA "0_3" into flash memory 140, memory controller 120 writes Data12 into the data area of a fourth page (i.e., page "3") of data block 520, the fourth page of data block 520 having PA "103_3". Memory controller 120 also writes LA "0_3" of Data12 into the spare area of the fourth page of data block 520. Memory controller 120 then updates cache [#0] in mapping cache 128 with an updated mapping relationship "0_3→103_3" (highlighted in grey in FIG. 5). Because memory controller 120 does not write any mapping information back to mapping table 144, write back cache 130 remains unchanged.

After the fourth page of data block 520 is written with data, memory controller 120 determines that data block 520 is full and, as a result, performs a journaling operation in step 515. In the journaling operation, memory controller 120 writes all of the mapping information, mapping cache information, and write back information into a third page (i.e., page "3") of journal table 146. First, memory controller writes the updated mapping information currently stored in mapping cache 128 into a mapping information area of page "3" of journal table 146. That is, memory controller 120 writes all of mapping relationships "0_2→103_0", "0_3→103_3", "4_0→103_1", and "4_1→103_2", into the mapping information area of page "3" of journal table 146.

Memory controller 120 also writes the cache numbers that are currently stored in mapping cache 128 into a final cache area of page "3" of journal table 146. That is, memory controller 120 writes cache numbers [#0] and [#4] into the final cache area of journal table 146. Memory controller 120 further writes the cache number that has been written back to mapping table 144 as indicated in write back cache 130, into a write back area of page "3" of journal table 146. That is, memory controller writes cache number [#3] into the write back area of page "3" of journal table 146.

Referring to FIG. 6, in step 611, when memory controller 120 receives a write request to write Data13 with LA "0_1" into flash memory 140, memory controller 120 assigns data block 620 having a physical block number "200" for writing data. Memory controller 120 then writes Data13 into the data area of a first page (i.e., page "0") of data block 620, the first page of data block 620 having PA "200_0". Memory controller 120 also writes LA "0_1" of Data13 into the spare area of the first page of data block 620. Memory controller 120 then updates cache [#0] in mapping cache 128 with an updated mapping relationship "0_1→200_0" (highlighted in grey in FIG. 6). At this stage, memory controller 120 loads the cache numbers recorded in the final cache area of the previous page (i.e., page "3") of journal table 146 into write back cache 130. That is, memory controller 120 loads cache numbers [#0] and [#4] into write back cache 130. However, because memory controller 120 does not write any mapping information in mapping cache 128 back to flash memory 140, there is no data entry corresponding to cache number [#0] and [#4] in write back cache 130.

In step 612, when memory controller 120 receives a write request to write Data14 with LA "4_2" into flash memory 140, memory controller 120 writes Data14 into the data area of a second page (i.e., page "1") of data block 620, the second page of data block 620 having PA "200_1". Memory controller 120 also writes LA "4_2" of Data14 into the spare area of the second page of data block 620. Memory controller 120 then updates cache [#4] in mapping cache 128 with an updated mapping relationship "4_2→200_1" (highlighted in grey in FIG. 6). Because memory controller 120 does not write any mapping information back to mapping table 144, write back cache 130 remains unchanged.

In step 613, when memory controller 120 receives a write request to write Data15 with LA "4_3" into flash memory 140, memory controller 120 writes Data15 into the data area of a third page (i.e., page "0") of data block 620, the third page of data block 620 having PA "200_2". Memory controller 120 also writes LA "4_3" of Data15 into the spare area of the third page of data block 620. Memory controller 120 then updates cache [#4] in mapping cache 128 with an updated mapping relationship "4_3→200_2" (highlighted in grey in FIG. 6). Because memory controller 120 does not write any mapping information back to mapping table 144, write back cache 130 remains unchanged.

The writing process on flash memory 140 can continue with similar steps as previously described. However, when power being supplied to system 100 is interrupted, data in SRAM 124 is lost. In such case, when power is restored to system 100, memory controller 120 recovers mapping information, by scanning data stored in data block 620, mapping table 144, and journal table 146 of flash memory 140.

FIG. 7 illustrates an example of a recovery process, according to an illustrated embodiment. The recovery process is performed when power of system 100 is restored after an interruption. In the example illustrated in FIG. 7, the power interruption occurs after step 613 illustrated in FIG. 6, wherein memory controller 120 just completes writing Data15 with LA "4_3" into data block 620, and updates mapping cache 128 with the updated mapping relationship "4_3→200_2". Due to the power interruption, data in SRAM 124 is lost, while data stored in data block 620, mapping table 144, and journal table 146 of flash memory 140 remains unchanged.

Referring to FIG. 7, in step 711a, memory controller 120 reads the mapping cache information stored in the final cache area of the last page (i.e., page "3") of journal table 146 of flash memory 140, and obtains cache numbers [#0] and [#4], which indicate that only the mapping information in mapping table 144 corresponding to logical block numbers "0" and "4" has been changed and has not been written back to mapping table 144 of flash memory 140. That is, the mapping information in mapping table 144 corresponding to logical block numbers "0" and "4" is not up-to-date, while the mapping information in mapping table 144 corresponding to logical block numbers "1", "2", and "3" is up-to-date. At this stage, memory controller 120 does not load any mapping information from mapping table 144 to mapping cache 128 of SRAM 124, and thus mapping cache 128 is empty.

In step 711b, memory controller 120 reads the mapping cache information stored in the final cache area of page "1" of journal table 146, and obtains cache numbers [#0] and [#1]. Memory controller 120 then determines that cache [#0] also exists in the mapping cache information stored in the last page (i.e., page "3") of journal table 146. That is, the mapping information in mapping cache 128 corresponding to logical block number "0" is not up-to-date, while the mapping information in mapping cache 128 corresponding to logical block number "1" is up-to-date. Thus, memory controller 120 does not need to load the mapping information related to logical block number "1" into mapping cache 128. Memory controller 120 only loads the mapping information related to logical block number "0" from mapping table 144 into mapping cache 128 as cache [#0].

In step 711c, memory controller 120 reads the mapping information stored in the mapping information area of page "1" of journal table 146, and updates mapping cache 128 according to the read mapping information. That is, memory controller 120 reads mapping relationships "0_0→101_0", "1_0→101_1", "1_1→101_2", and "1_2→101_3" stored in the mapping information area of page "1" of journal table 146. Because mapping relationships "1_0→101_1", "1_1→101_2", and "1_2→101_3" correspond to mapping information of logical block number "1", which is up-to-date in mapping cache 128, memory controller 120 does not need to update mapping cache 128 according to the mapping relationships "1_0→101_1", "1_1→101_2", and "1_2→101_3". Memory controller 120 only updates cache [#0] in mapping cache 128 with the read mapping relationship "0_0→101_0" (highlighted in grey in FIG. 7).

In step 712a, memory controller 120 reads the data stored in the write back area of page "2" of journal table 146, and obtains cache numbers [#0] and [#1], which indicate that the mapping information in mapping cache 128 corresponding to logical block numbers "0" and "1" had been written back to mapping table 144 before the power interruption occurs. Because cache number [#0] currently exists in mapping cache 128, memory controller 120 determines to remove the mapping information contained in cache [#0] from mapping cache 128.

In step 712b, memory controller 120 reads the data stored in the final cache area of page "2" of journal table 146, and obtains cache numbers [#0] and [#3]. Because the mapping information in mapping cache 128 corresponding to logical block number "3" is up-to-date, memory controller 120 does not need to load the mapping information related to logical block number "3" into mapping cache 128. Memory controller 120 only loads the mapping information related to logical block number "0" from mapping table 144 into mapping cache 128 as cache [#0].

In step 712c, memory controller 120 reads the mapping information stored in the mapping information area of page "2" of journal table 146, and updates mapping cache 128 according to the read mapping information. That is, mapping controller reads mapping relationships "0_3→102_3", and "3_1→102_2" stored in the mapping information area of page "2" of journal table 146. Because the mapping relationship "3_1→102_2" corresponds to mapping information of logical block number "3", which is up-to-date in mapping table 144, memory controller 120 does not need to update mapping cache 128 according to the mapping relationship "3_1→102_2". Memory controller 120 only updates cache [#0] in mapping cache 128 with the mapping relationship "0_3→102_3" (highlighted in grey in FIG. 7).

In step 713a, memory controller 120 reads the data stored in the write back area of page "3" of journal table 146, and obtains cache number [#3], which indicate that the mapping information in mapping cache 128 corresponding to logical block number "3" had been written back to mapping table 144 before the power interruption occurs. Because mapping cache 128 does not contain cache [#3], memory controller 120 determines to do nothing on mapping cache 128.

In step 713b, memory controller 120 reads the data stored in the final cache area of page "3" of journal table 146, and obtains cache numbers [#0] and [#4]. Because mapping cache 128 already contains cache number [#0], memory controller 120 only loads the mapping information related to logical block number "4" from mapping table 144 into mapping cache 128 as cache [#4].

In step 713c, memory controller 120 reads the mapping information stored in the mapping information area of page "3" of journal table 146, and updates mapping cache 128 according to the read mapping information. That is, memory controller 120 reads mapping relationships "0_2→103_0", "0_3→103_3", "4_0→103_1", and "4_1→103_2", stored in the mapping information area of page "3" of journal table 146. Memory controller 120 then updates cache [#0] and [#3] in mapping cache 128 with the read mapping relationships "0_2→103_0", "0_3→103_3", "4_0→103_1", and "4_1→103_2" (highlighted in grey in FIG. 7).

In step 714, memory controller 120 scans current data block 620, which is the last data block used by memory controller 120 before the power interruption, and obtains mapping relationships "0_1→200_0", "4_2→200_1", and "4_3→200_2". Memory controller 120 then updates mapping cache 128 with the obtained mapping relationships "0_1→200_0", "4_2→200_1", and "4_3→200_2" (highlighted in grey in FIG. 7).

Then, memory controller 120 finishes the recovery process. Mapping cache 128 at step 714 at the end of the recovery process is the same as mapping cache 128 at step 613 when the power interruption occurs. That is, by scanning data stored in data block 620, mapping table 144, and journal table 146 of flash memory 140, memory controller 120 recovers the mapping information to a state before the power interruption.

Figure 8:
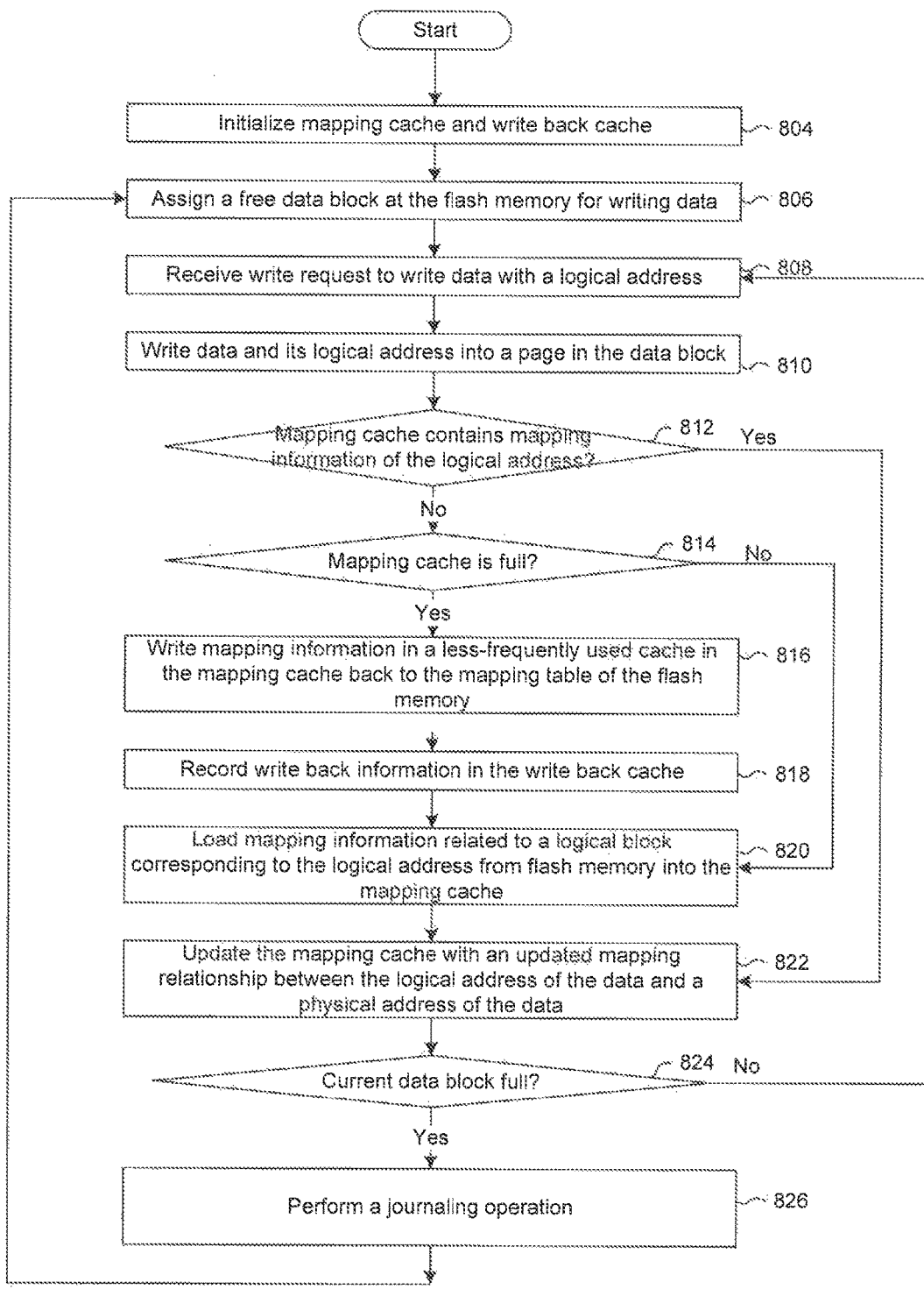
FIG. 8 is a flowchart illustrating a writing process performed by a memory controller, according to an illustrated embodiment.

FIG. 8 is a flowchart illustrating a writing process performed by memory controller 120, according to an illustrated embodiment. Referring to FIG. 8, when system 100 is powered up, memory controller 120 initializes mapping cache 128 and write back cache 130 of SRAM 124 (step 804). For example, memory controller 120 initializes mapping cache 128 and write back cache 130 of SRAM 124 by clearing mapping cache 128 and write back cache 130. As a result, mapping cache 128 and write back cache 130 are empty.

Memory controller 120 allocates a free data block in flash memory 140 for writing data (step 806). For example, as illustrated in step 312 of FIG. 3, memory controller 120 assigns data block 320 having a physical block number "101" for writing data.

Memory controller 120 receives a write request from host 110, to write data with a logical address into flash memory 140 (step 808). For example, as illustrated in step 312 of FIG. 3, memory controller 120 receives a write request to write Data1 with LA "0_0" into flash memory 140.

In response to receiving the write request, memory controller 120 writes the data and its logical address in a page of the assigned data block (step 810). For example, as illustrated in step 313 of FIG. 3, memory controller 120 writes Data1 into the data area of the first page of data block 320, and writes LA "0_0" of Data1 into the spare area of the first page of data block 320.

Memory controller 120 then stores, in mapping cache 128 of SRAM 124, an updated mapping relationship between the logical address of the data and the physical address of the data. For example, as illustrated in step 312 of FIG. 3, memory controller 120 needs to store, in mapping cache 128, the updated mapping relationship between LA "0_0" and PA "101_0" of the first page of data block 320.

Specifically, memory controller 120 first determines whether mapping cache 128 contains mapping information of the logical address of the data (step 812). If mapping cache 128 does not contain the mapping information of the logical address of the data (step 812: No), memory controller 120 determines whether mapping cache 128 is full (step 814). If mapping cache 128 is full (step 814: Yes), memory controller 120 writes the mapping information in a less-frequently used cache in mapping cache 128 back to mapping table 144 of flash memory 140 (step 816), and records the write back information in write back cache 130 (step 818). The write back information indicates that the mapping information in the less-frequently used cache has been written back to mapping table 144 of flash memory 140. Memory controller 120 then loads the mapping information regarding a logical block corresponding to the logical address from mapping table 144 into mapping cache 128 (step 820), and updates mapping cache 128 with the updated mapping relationship between the logical address of the data and the physical address of the data (step 822).

For example, as illustrated in step 412 of FIG. 4, in order to store the updated mapping relationship "2_0→102_1" in mapping cache 128 of SRAM 124, memory controller 120 first determines that mapping cache 128 does not contain the mapping information of LA "2_0" of the data, and that mapping cache 128 is full, i.e., mapping cache 128 currently has cache [#0] and cache [#1] that respectively store mapping information of logical block "0" and logical block "1", and reaches its maximum capacity of storing mapping information of two logical blocks. As a result, memory controller 120 writes mapping information in the less-frequently used cache, i.e., cache [#1], back to mapping table 144 of flash memory 140, and records the write back information in write back cache 130, indicating that the mapping information in cache [#1] has been written back to flash memory 140. Memory controller 120 then loads the mapping information related to logical block number "2" (which corresponds to LA "2_0" in the updated mapping relationship) from mapping table 144 into mapping cache 128, and updates cache [#2] in mapping cache 128 with the updated mapping relationship "2_0→102_1".

Referring back to FIG. 8, if memory controller 120 determines that mapping cache 128 contains the mapping information of the logical address of the data (step 812: Yes), memory controller 120 directly updates mapping cache 128 with the updated mapping relation between the logical address of the data and the physical address of the data (step 822). For example, as illustrated in step 314 of FIG. 3, in order to store the updated mapping relationship "1_1→101_2" in mapping cache 128, memory controller 120 determines that mapping cache 128 contains cache [#1] with the mapping information of LA "1_1", and directly updates cache [#1] in mapping cache 128 with the updated mapping relationship "1_1→101_2".

Referring back to FIG. 8, if memory controller 120 determines that mapping cache 128 does not contain the mapping information of the logical address of the data (step 812: No), but mapping cache 128 is not full (step 814: No), memory controller 120 directly loads the mapping information regarding a logical block corresponding to the logical address from mapping table 144 into mapping cache 128 (step 820), and updates mapping cache 128 with the updated mapping relationship between the logical address of the data and the physical address of the data (step 822). For example, as illustrated in step 313 of FIG. 3, in order to store the updated mapping relationship "1_0→101_1" in mapping cache 128, memory controller 120 determines that mapping cache 128 does not contain the mapping information related to LA "1_0", but mapping cache 128 is not full. As a result, memory controller 120 loads the mapping information related to logical block number "1", which corresponds to LA "1_0", from mapping table 144 into mapping cache 128 as cache [#1], and updates cache [#1] in mapping cache 128 with the updated mapping relationship "1_0→101_1".

Referring back to FIG. 8, after memory controller 120 updates mapping cache 128 with the updated mapping in step 822, memory controller 120 determines whether the current data block is full (step 824). If the current data block is full (step 824: Yes), memory controller 120 performs a journaling operation to write the updated mapping information in mapping cache 128, mapping cache information in mapping cache 128, and the write back information in write back cache 130 into journal table 146 of flash memory 140 (step 826). Then, memory controller 120 returns to step 806 to assign a free data block of flash memory 140 for writing future data. If the current data block is not full (step 824: No), memory controller 120 returns to step 808 to receive write request to write data. For example, as illustrated in step 415 of FIG. 4, when memory controller 120 determines that data block 320 is full, memory controller 120 writes all of mapping relationships "0_3→102_3" and "3_1→102_2" to the mapping information area of journal table 146. Memory controller 120 also writes cache numbers [#0] and [#3] that are currently stored in mapping cache 128 into the final cache area of journal table 146. Memory controller 120 further writes cache numbers [#0] and [#1] that are currently stored in write back cache 130, into the write back area of journal table 146. Memory controller 120 then assigns data block 420 illustrated in FIG. 4 for writing future data.

Figure 9:
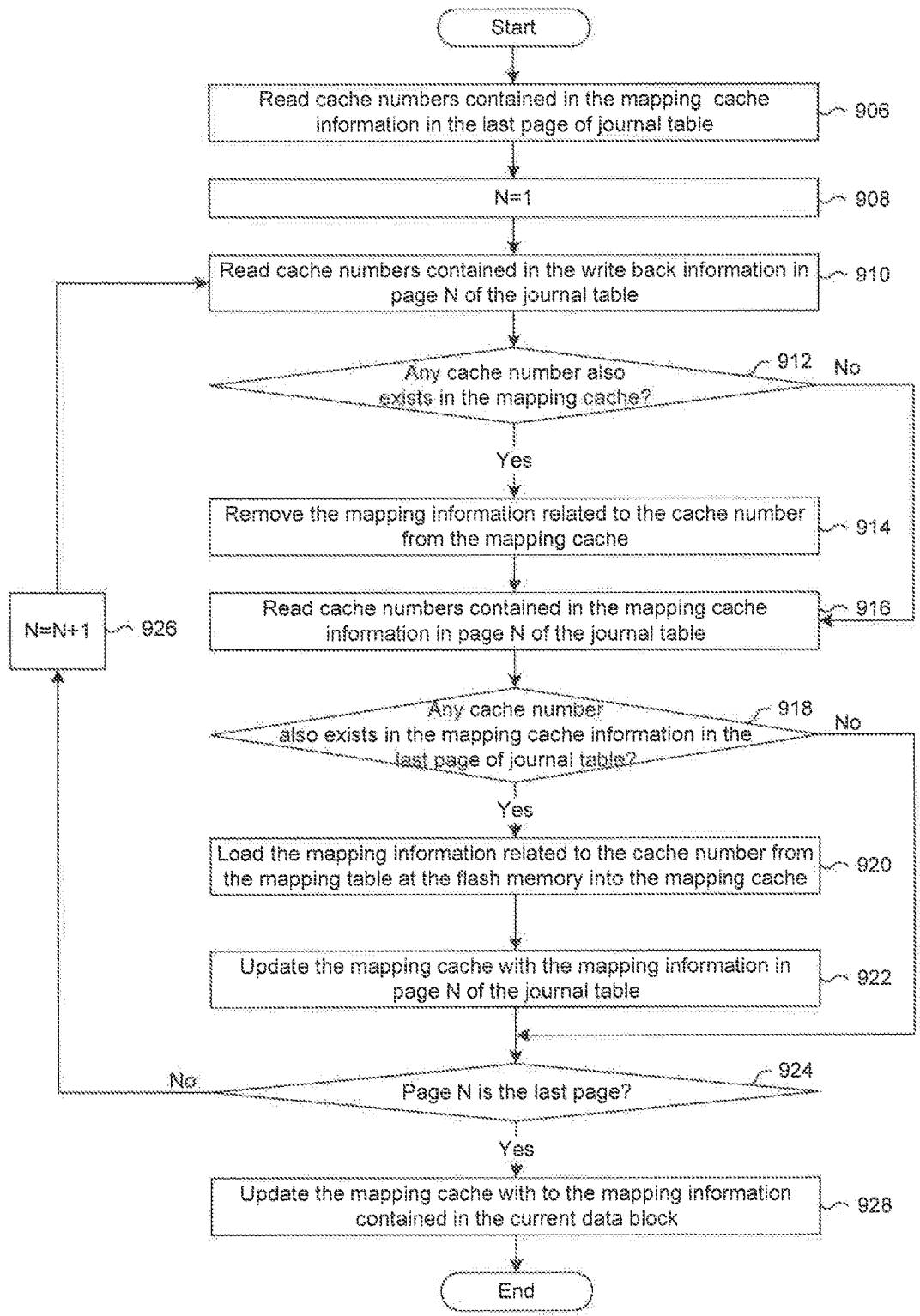
FIG. 9 is a flowchart illustrating a recovery process performed by the memory controller, according to an illustrated embodiment.

FIG. 9 is a flowchart illustrating a recovery process performed by memory controller 120, according to an illustrated embodiment. Referring to FIG. 9, when memory controller 120 determines that the power of system 100 is restored following a power interruption, memory controller 120 reads the cache numbers contained in the mapping cache information stored in the last page of journal table 146 (step 906). For example, as' illustrated in step 711a of FIG. 7, memory controller 120 reads the mapping cache information stored in the final cache area of the last page (i.e., page "3") of journal table 146, and obtains cache numbers [#0] and [#4]. At this time, because data in SRAM 124 is lost due to the power interruption, mapping cache 128 is empty.

Then, memory controller 120 recovers the mapping information in mapping cache 128 by sequentially reading the information stored in different pages in journal table 146, starting from the first page. First, memory controller 120 set a page index N to 1 (step 908). Memory controller 120 then reads the cache numbers contained in the write back information in page N of journal table 146 (step 910). For example, as illustrated in step 711a of FIG. 7, when N=1, memory controller 120 reads "FF,FF" contained in the write back information in page "1" of journal table 146, indicating that no mapping information has been written back to flash memory 140 when memory controller 120 writes information into page "1" of journal table 146. As another example, as illustrated in step 712a of FIG. 7, when N=2, memory controller 120 reads [#0] and [#1] contained in the write back information in page "2" of journal table 146, indicating that the mapping information contained in cache numbers [#0] and [#1] of mapping cache 128 has been written back to flash memory 140 when memory controller 120 writes mapping information into page "2" of journal table 146.

Referring back to FIG. 9, memory controller 120 determines whether any cache number in the write back information, that was read in step 910, also exists in mapping cache 128 (step 912). If one or more cache numbers read in step 910 also exist in mapping cache 128 (step 912: Yes), memory controller 120 removes the mapping information related to the one or more cache numbers from mapping cache 128 (step 914). For example, as illustrated in step 712a of FIG. 7, when N=2, memory controller 120 reads [#0] and [#1] contained in the write back information in page "2" of journal table 146, and determines that cache number [#0] currently exists in mapping cache 128. As a result, memory controller 120 removes the mapping information contained in cache [#0] from mapping cache 128.

Following step 914, memory controller 120 reads the cache numbers contained in the mapping cache information in page N of journal table 146 (step 916). Alternatively, if memory controller 120 determines that there is no cache number read in step 910 that exists in mapping cache 128 (step 912: No), memory controller 120 directly moves to step 916 to read the cache numbers contained in the mapping cache information in page N of journal table 146. Following step 916, memory controller 120 determines whether any cache number read in step 916 also exists in the mapping cache information stored in the last page of journal table 146 (step 918). If one or more cache numbers read in step 916 that also exist in the mapping cache information stored in the last page of journal table 146 (step 918: Yes), memory controller 120 loads the mapping information related to the one or more cache numbers from mapping table 144 of flash memory 140 into mapping cache 128 (step 920). Memory controller 120 then updates mapping cache 128 with the mapping information stored in page N of journal table 146 (step 922).

For example, as illustrated in step 711b of FIG. 7, when N=1, memory controller 120 reads cache numbers [#0] and [#1] contained in the mapping cache information stored in the final cache area of page "1" of journal table 146. Memory controller 120 then determines that cache [#0] also exists in the mapping cache information stored in the last page of journal table 146. As a result, memory controller 120 loads the mapping information related to logical block number "0" from mapping table 144 of flash memory 140 into mapping cache 128. Memory controller 120 then reads mapping relationships "_0→101_0", "1_0→101_1", "1_1→101_2", and "1_2→101_3" stored in the mapping information area of page "1" of journal table 146, and updates mapping cache 128 with the mapping relationship "0_0→101_0", as illustrated in step 711c of FIG. 7.

Following step 922, memory controller 120 determines whether page N is the last page of journal table 146 (step 924). Alternatively, if memory controller 120 determines that there is no cache number that exists in the mapping cache information in the last page of journal table 146 (step 918: No), memory controller 120 directly moves to step 924 to determine whether page N is the last page of journal table 146. If page N is not the last page of journal table 146 (step 924: No), memory controller 120 sets N as N=N+1 (step 926), and returns to step 910 to read cache numbers contained in the write back information in page N of journal table 146.

Otherwise, if page N is the last page of journal table 146 (step 924: Yes), memory controller 120 updates mapping cache 128 with the mapping information contained in the current data block (step 928). For example, as illustrated in step 714 of FIG. 7, when memory controller 120 determines that page "3" is the last page of journal table 146, memory controller 120 updates mapping cache 128 with the mapping relationships "0_1→200_0", "4_2→200_1", and "4_3→200_2" contained in data block 620. Then, memory controller 120 completes the recovery process.

In the above-disclosed embodiments, a journaling operation is performed when a data block is full. However, in some embodiments, the journaling operation can be performed when the data block is not full. For example, the journaling operation can be performed after a predetermined period of time passes.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A memory device, comprising:
a memory controller; and
a non-volatile memory communicatively coupled to the memory controller and storing a mapping table and a journal table,
wherein the memory controller is configured to:
write data received from a host device and a logical address of the data into one of a plurality of data blocks of the non-volatile memory;
load mapping information related to the logical address of the data from the mapping table of the non-volatile memory into a mapping cache of the memory controller;
update the mapping cache with an updated mapping relationship between the logical address of the data and a physical address of the data; and
perform a journaling operation to write the updated mapping relationship into the journal table when the one of the plurality of data blocks written with the data received from the host device and the logical address of the data is full.

2. The memory device of claim 1, wherein the memory controller is further configured to assign a free data block for writing future data when the one of the plurality of data blocks is full.

3. The memory device of claim 1, wherein the memory controller is further configured to record operations performed on the mapping cache between two consecutive journaling operations in a write back cache.

4. The memory device of claim 3, wherein the memory controller is configured to perform the journaling operation by writing the information stored in the write back cache into the journal table.

5. The memory device of claim 1, wherein the memory controller is further configured to recover the mapping information in the mapping cache based on information stored in the journal table after power has been restored following a power interruption.

6. The memory device of claim 1, wherein the non-volatile memory is a flash memory.

7. The memory device of claim 1, wherein the memory controller includes a volatile memory.

8. A method for controlling a memory device by a memory controller, the memory device including a non-volatile memory which stores a mapping table and a journal table,
the method comprising:
writing data received from a host device and a logical address of the data into one of a plurality of data blocks of the non-volatile memory;
loading mapping information related to the logical address of the data from the mapping table of the non-volatile memory into a mapping cache of the memory controller;
updating the mapping cache with an updated mapping relationship between the logical address of the data and a physical address of the data; and
performing a journaling operation to write the updated mapping relationship into the journal table when the one of the plurality of data blocks written with the data received from the host device and the logical address of the data is full.

9. The method of claim 8, further including assigning a free data block for writing future data when the one of the plurality of data blocks is full.

10. The method of claim 8, wherein the method further includes recording operations performed on the mapping cache between two consecutive journaling operations in a write back cache.

11. The method of claim 10, wherein the journaling operation includes writing the information stored in the write back cache into the journal table.

12. The method of claim 8, further comprising:
recovering the mapping information in the mapping cache based on information stored in the journal table after power has been restored following a power interruption.

13. A memory controller for controlling a non-volatile memory, the non-volatile memory stores a mapping table and a journal table,
the memory controller comprising processing circuitry configured to:
write data received from a host device and a logical address of the data into one of a plurality of data blocks of the non-volatile memory;

load mapping information related to the logical address of the data from the mapping table of the non-volatile memory into a mapping cache of the memory controller;

update the mapping cache with an updated mapping relationship between the logical address of the data and a physical address of the data; and perform a journaling operation to write the updated mapping relationship into the journal table when the one of the plurality of data blocks written with the data received from the host device and the logical address of the data is full.

14. The memory controller of claim 13, wherein the processing circuitry of the memory controller is configured to assign a free data block for writing future data when the one of the plurality of data blocks is full.

15. The memory controller of claim 13, wherein the processing circuitry of the memory controller is further configured to record operations performed on the mapping cache between two consecutive journaling operations in a write back cache.

16. The memory controller of claim 15, wherein the processing circuitry of the memory controller is configured to perform the journaling operation by writing the information stored in the write back cache into the journal table.

17. The memory controller of claim 13, wherein the processing circuitry of the memory controller is further configured to recover the mapping information in the mapping cache based on information stored in the journal table after power has been restored following a power interruption.

18. A memory device, comprising:
a memory controller; and
a non-volatile memory communicatively coupled to the memory controller and storing a mapping table and a journal table,
wherein the memory controller is configured to:
write data and a logical address of the data into the non-volatile memory;
load mapping information related to the logical address of the data from the mapping table of the non-volatile memory into a mapping cache of the memory controller;
update the mapping cache with an updated mapping relationship between the logical address of the data and a physical address of the data; and
perform a journaling operation to write the updated mapping relationship into the journal table,
wherein the memory controller is further configured to, when the mapping cache is full:
write a portion of the mapping information stored in the mapping cache back to the mapping table; and
record a location of the portion of the mapping information in the mapping cache in a write back cache of the memory controller.

19. The memory device of claim 18, wherein the memory controller is configured to perform the journaling operation by writing the information stored in the write back cache into the journal table.

* * * * *